(12) United States Patent
Lee et al.

(10) Patent No.: US 11,154,171 B2
(45) Date of Patent: Oct. 26, 2021

(54) CLEANER

(71) Applicant: LG ELECTRONICS INC., Seoul (KR)

(72) Inventors: Sangik Lee, Seoul (KR); Seungjin Lee, Seoul (KR); Seaunglok Ham, Seoul (KR)

(73) Assignee: LG ELECTRONICS INC., Seoul (KR)

(*) Notice: Subject to any disclaimer, the term of this patent is extended or adjusted under 35 U.S.C. 154(b) by 307 days.

(21) Appl. No.: 16/352,978

(22) Filed: Mar. 14, 2019

(65) Prior Publication Data

US 2019/0282054 A1 Sep. 19, 2019

(30) Foreign Application Priority Data

Mar. 14, 2018 (KR) .................. 10-2018-0029783

(51) Int. Cl.
*A47L 9/28* (2006.01)
*A47L 9/16* (2006.01)
*A47L 9/14* (2006.01)
*A47L 9/32* (2006.01)

(52) U.S. Cl.
CPC .......... *A47L 9/2826* (2013.01); *A47L 9/1409* (2013.01); *A47L 9/2836* (2013.01); *A47L 9/2857* (2013.01); *A47L 9/322* (2013.01); *A47L 2201/04* (2013.01)

(58) Field of Classification Search
CPC ...... A47L 2201/04; A47L 5/225; A47L 9/009; A47L 9/1409; A47L 9/1691; A47L 9/2826; A47L 9/2836; A47L 9/2857; A47L 9/322
See application file for complete search history.

(56) References Cited

U.S. PATENT DOCUMENTS

| | | | |
|---|---|---|---|
| 2017/0245712 A1* | 8/2017 | Son | A47L 9/00 |
| 2017/0245714 A1* | 8/2017 | Son | A47L 9/0081 |
| 2017/0245719 A1* | 8/2017 | Son | A47L 5/362 |
| 2017/0332855 A1* | 11/2017 | Seo | A47L 9/1683 |
| 2018/0368645 A1* | 12/2018 | Ham | G05D 1/0231 |

FOREIGN PATENT DOCUMENTS

| | | | | |
|---|---|---|---|---|
| CN | 108209748 | | 6/2018 | |
| JP | 2012-45383 | | 3/2012 | |
| JP | 6174294 | | 8/2017 | |
| JP | 6174294 B2 | * | 8/2017 | ............. G08B 13/19 |
| KR | 10-2003-0013008 | | 2/2003 | |
| KR | 20030013008 A | * | 2/2003 | |

(Continued)

OTHER PUBLICATIONS

KR-100829094-B1—English Machine Translation (Year: 2008).*

(Continued)

*Primary Examiner* — Marc Carlson
(74) *Attorney, Agent, or Firm* — Ked & Associates LLP

(57) ABSTRACT

A cleaner may include a cleaner main body or a main body; a dust container which is accommodated in the cleaner main body; a dust container cover or a cover which covers an upper portion of the dust container; a handle which is coupled to an upper end of the dust container cover; a sensing unit or module which detects information around the cleaner main body; and a rotation module or assembly which rotates the sensing unit relatively with respect to the dust container cover.

19 Claims, 11 Drawing Sheets

(56) References Cited

FOREIGN PATENT DOCUMENTS

| KR | 10-0640752 | | | 11/2006 |
|---|---|---|---|---|
| KR | 100640752 | B1 | * | 11/2006 |
| KR | 10-0829094 | | | 5/2008 |
| KR | 100829094 | B1 | * | 5/2008 |
| KR | 10-0962123 | | | 6/2010 |
| KR | 100962123 | B1 | * | 6/2010 |
| KR | 10-2012-0098192 | | | 9/2012 |
| KR | 20120098192 | A | * | 9/2012 |
| KR | 10-1490170 | | | 2/2015 |
| KR | 10-1710397 | | | 2/2017 |
| KR | 101710397 | B1 | * | 2/2017 |
| KR | 10-2017-0131164 | | | 11/2017 |
| KR | 10-2017-0131289 | | | 11/2017 |
| TW | 201731435 | | | 9/2017 |
| TW | 1610650 | | | 1/2018 |

OTHER PUBLICATIONS

International Search Report dated Jul. 10, 2019.
U.S. Appl. No. 16/369,060, filed Mar. 29, 2019.
Taiwanese Office Action dated Nov. 8, 2019 issued in TW Application No. 108110775.
Taiwan Office Action dated Dec. 17, 2019 (English Translation).
Korean Notice of Allowance dated Nov. 25, 2019 issued in KR Application No. 10-2018-0029783.

* cited by examiner

CLEANER

CROSS-REFERENCE TO RELATED APPLICATION(S)

This application claims priority under 35 U.S.C. § 119 to Korean Application No. 10-2018-0029783 filed on Mar. 14, 2018, whose entire disclosure(s) is/are hereby incorporated by reference.

BACKGROUND

1. Field

The present invention relates to a cleaner having a rotatable sensor.

2. Background

In general, a cleaner may include a cleaner main body or a main body having a suction unit and a dust container or a dust bin, and a cleaning nozzle which is coupled to the cleaner main body and performs cleaning while being in close contact with a surface to be cleaned, e.g., floor.

The cleaner may be divided into a manual cleaner for manually cleaning the surface to be cleaned by a user and an automatic cleaner for cleaning the surface to be cleaned while traveling by itself or autonomously.

According to the manual cleaner, in a state where the suction unit generates a suction force by a driving force of an electric motor, when the user places the cleaning nozzle or the cleaner main body on the surface to be cleaned while the user holds the cleaning nozzle or the cleaner main body by hand, the cleaning nozzle sucks foreign matter including dust on the surface to be cleaned, and the sucked foreign matter is collected in the dust container, thereby cleaning the surface to be cleaned.

In addition, according to the automatic cleaner, the cleaner main body having the suction unit and the dust container may be provided with various sensing units or sensors (e.g., an ultrasonic sensor and/or a camera sensor) to detect a traveling area, to recognize a surrounding environment, to avoid an obstacle, and to detect a cliff or drop-off, for example. The cleaning nozzle sucks the foreign matter on the surface to be cleaned by the suction force generated in the suction unit while the cleaner main body automatically travels around the surface to be cleaned, and the sucked foreign matter is collected in the dust container, thereby cleaning the surface to be cleaned.

A sensing unit used in the automatic cleaner employs an optical system that irradiates light in one direction and detects reflected light or a system that emits sound waves in one direction and detects reflected sound waves. Such a sensing unit can only collect environmental information within a certain angle (angle of view) with respect to the sensing direction.

According to the conventional automatic cleaner, the sensing unit is installed in front of the cleaner main body and the sensing unit can not rotate or move. Thus, there is a problem in that a detection range (angle of view) that the sensing unit can detect is very limited.

Korean Patent Laid-Open Publication No. 10-2017-0131289 discloses a cleaner having a sensing unit that is fixed to the front of a cleaner main body. In the conventional automatic cleaner, since the sensing unit is fixed in the movement direction of the main body of the cleaner, there is a problem in that it is difficult to recognize an obstacle positioned in the lateral direction.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
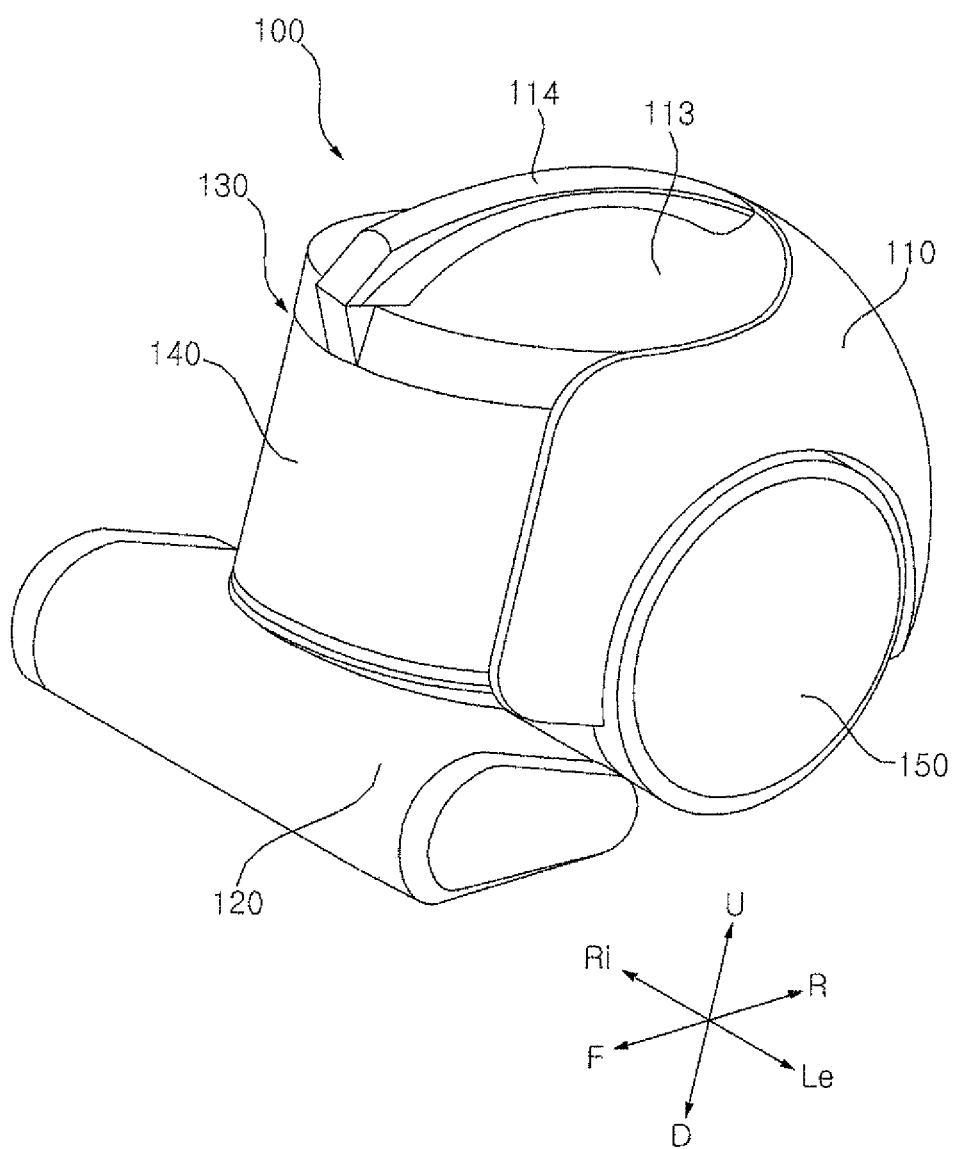
FIG. 1 is a perspective view showing a cleaner according to an embodiment.

Hereinafter, embodiments of the present disclosure will be described with reference to the accompanying drawings. In describing the present embodiment, the same designations and the same reference numerals are used for the same components, and further description thereof will be omitted. It will be understood that when an element (e.g., first element) is referred to as being "connected" or "coupled" to another element (e.g., second element), it can be directly connected or coupled to the other element (e.g., third element) or intervening elements may be present. The terminology used herein is for the purpose of describing particular example embodiments only and is not intended to be limiting of the present inventive concept. It should also be noted that in some alternative implementations, the functions/acts noted in the blocks may occur out of the order noted in the flowcharts.

Hereinafter, a cleaner according to an embodiment of the present disclosure will be described with reference to the drawings. FIG. 1 is a perspective view showing a cleaner according to an embodiment, and FIG. 2 is a view showing a cleaner in a state in which a dust container is separated in FIG. 1.

Figure 2:
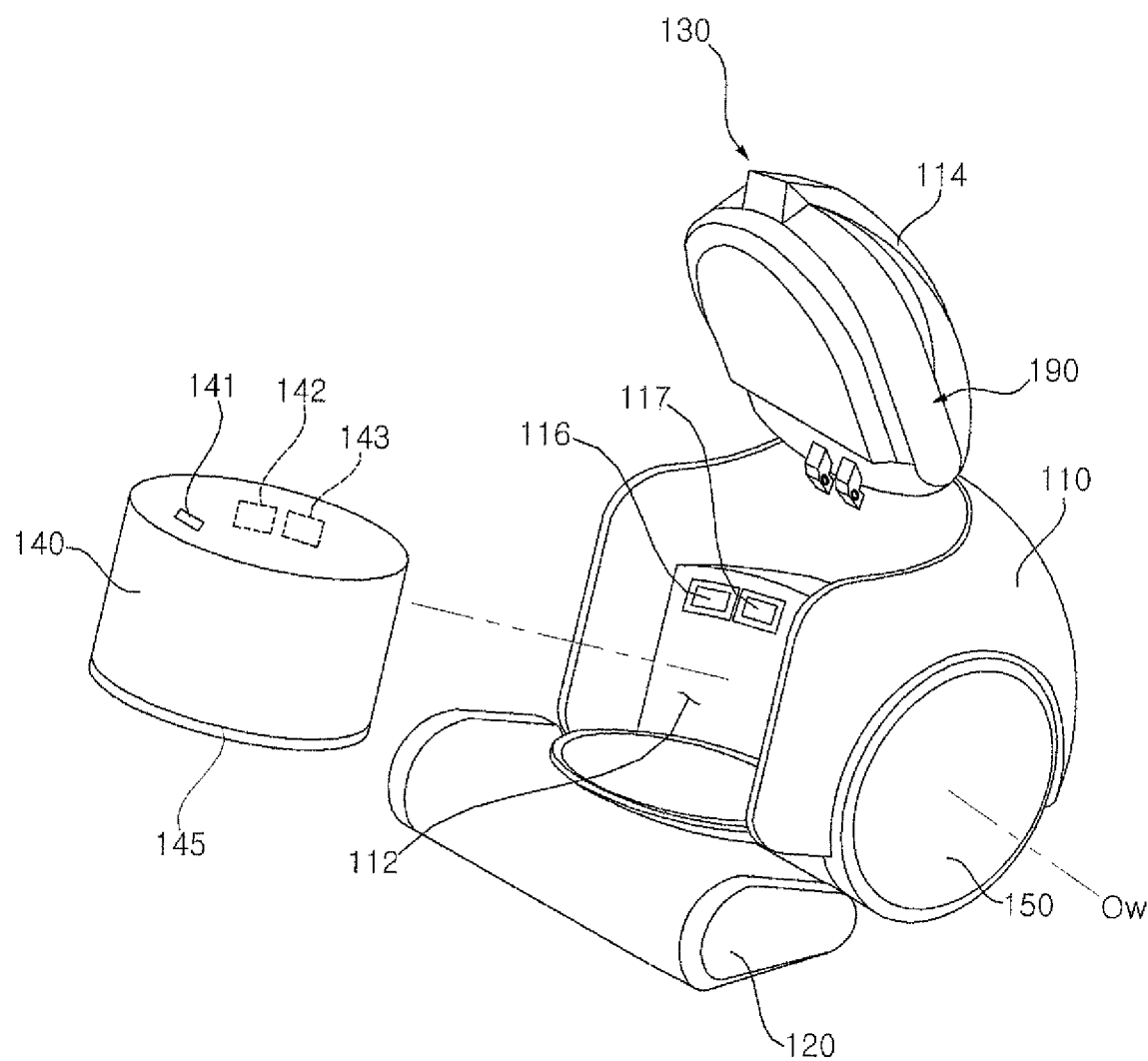
FIG. 2 is a view showing a cleaner in a state in which a dust container is separated in FIG. 1.
Figure 3:
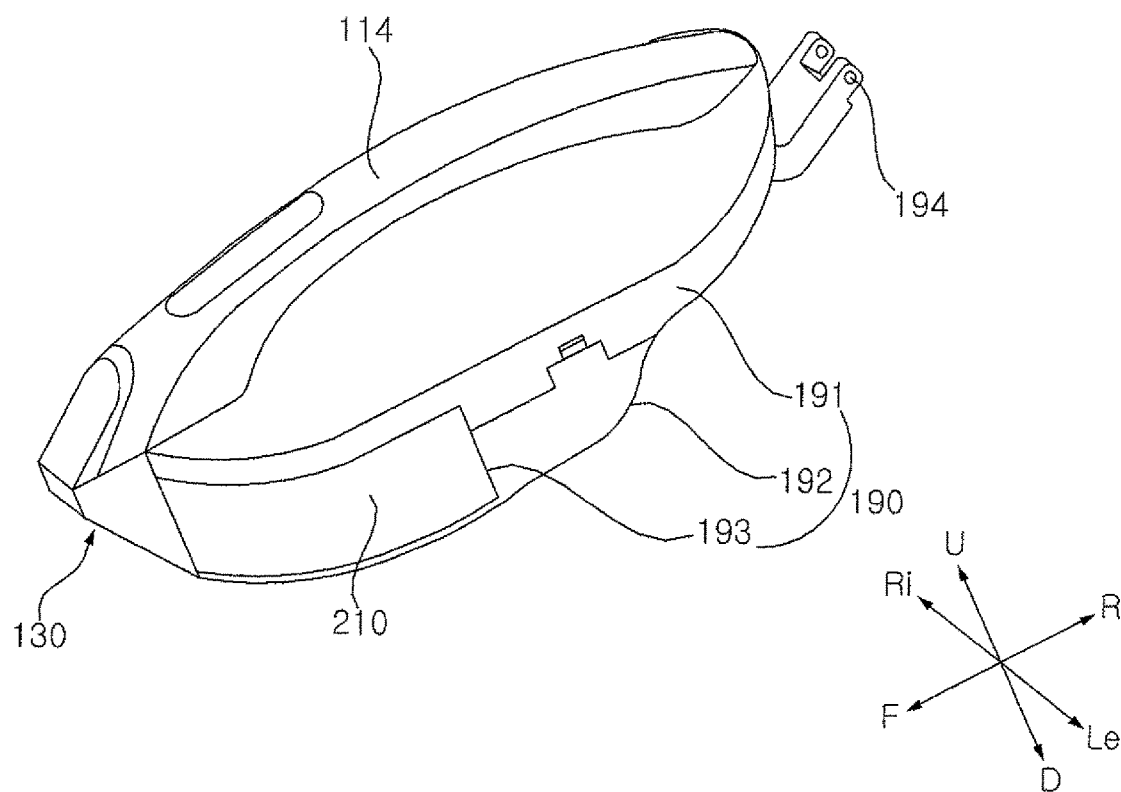
FIG. 3 is a perspective view of a dust container cover including a sensing unit and a rotation module according to an embodiment.
Figure 4:
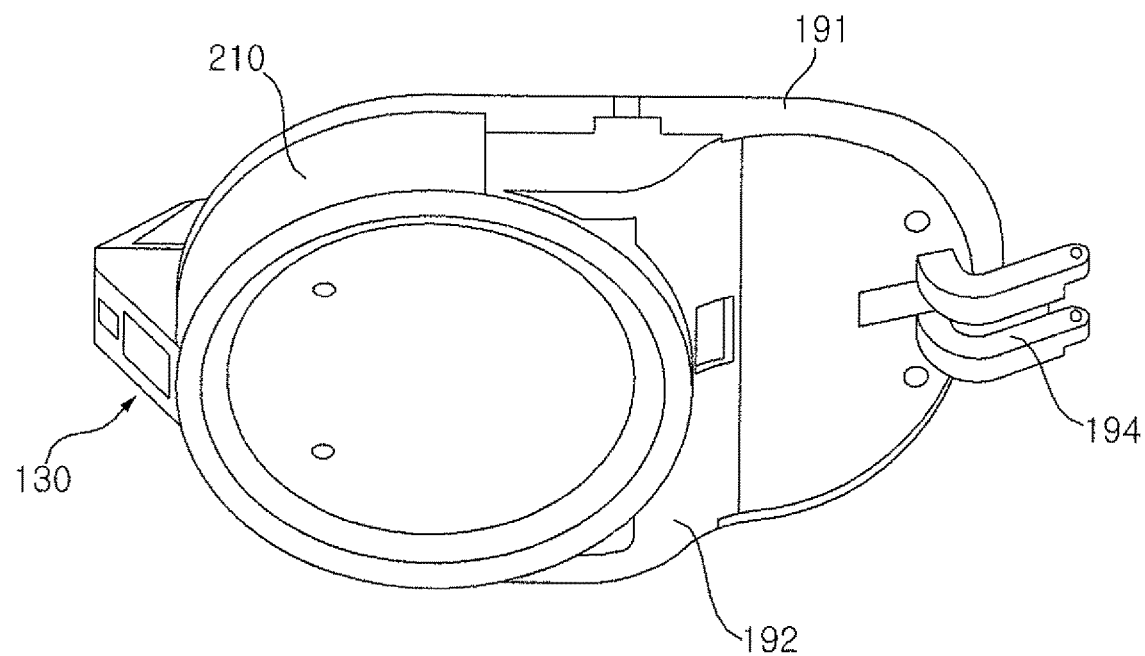
FIG. 4 is a perspective view of the dust container cover of FIG. 3 when viewed from a direction different from that of FIG. 3.

Referring to FIG. 1 and FIG. 2, a mobile robot 100 (e.g., a cleaner) may include a cleaner main body or a main body 110, a cleaning nozzle or head 120, a sensing unit or module 130, and a dust container or dust bin 140. The dust container 140 may also be referred to as a dust box.

The cleaner 100 may further include a dust container cover or a cover 190 covering an upper portion or top of the dust container 140 and a rotation module or rotation assembly that rotates the sensing unit 130 relative to the dust container cover 190. The dust container cover 190 may also be referred to as a lid. The cleaner main body 110 may include various components including a controller (not shown) to control the cleaner 100. The cleaner main body 110 may form a space to accommodate or house various components constituting the cleaner 100.

The cleaner main body 110 may be selected in one of an automatic mode and a manual mode by the user and travel. The cleaner main body 110 may be provided with a mode selection input unit or device to select one of the automatic mode and the manual mode. When the user selects the automatic mode in the mode selection input unit, the cleaner main body 110 may automatically travel as a robot cleaner. In addition, when the user selects the manual mode in the mode selection input unit, the cleaner main body 110 may travel manually by being pulled or pushed by the user's force.

The cleaner main body 110 may be provided with a wheel or a wheel assembly 150 to move the cleaner main body 110. The wheel assembly 150 may include a motor (not shown) and at least one wheel or roller rotated by a driving force of the motor. The rotation direction of the motor may be controlled by a controller (not shown), and thus, a wheel of the wheel assembly 150 may be configured to be rotatable in one direction or the other direction.

Wheel assemblies 150 may be provided in both left and right sides of the cleaner main body 110, respectively. The cleaner main body 110 may be moved back and forth or left and right by the wheel assembly 150, or rotated. Each of the wheel assemblies 150 may be configured to be drivable independently of each other. Each wheel assembly 150 may be driven by a different motor. The controller may control a driving of the wheel assembly 150 so that the cleaner 100 may be implemented to autonomously travel on the floor.

The wheel assembly 150 may be provided in a lower portion or bottom of the cleaner main body 110 to move the cleaner main body 110. The wheel assembly 150 may be configured only of circular wheels, may be configured by circular rollers which are connected by a belt chain, or may be configured by a combination of circular wheels and circular rollers which are connected by a belt chain. An upper portion of the wheel of the wheel assembly 150 may be provided inside the cleaner main body 110, and a lower portion thereof may protrude to a lower side of the cleaner main body 110. At least the lower portion of the wheel of the wheel assembly 150 may be provided in contact with a floor or floor surface, which is a surface to be cleaned, so that the cleaner main body 110 can travel.

The wheel assemblies 150 may be installed in the left and right sides of the cleaner main body 110, respectively. The wheel assembly 150 provided in the left side of the cleaner main body 110 and the wheel assembly 150 provided in the right side of the cleaner 100 may be independently driven. The wheels of the wheel assembly 150 provided in the left side of the cleaner main body 110 may be coupled to each other via at least one first gear, and may be rotated by a driving force of a first traveling motor that rotates the first gear. In addition, the wheels of the assembly 150 provided in the right side of the cleaner main body 110 may be coupled to each other via at least one second gear, and may be rotated by a driving force of a second traveling motor that rotates the second gear.

The controller may determine a travelling direction of the cleaner main body 110 by controlling the rotational speed of each rotating shaft of the first traveling motor and the second traveling motor. For example, when the rotating shafts of the first traveling motor and the second traveling motor are simultaneously rotated at the same speed, the cleaner main body 110 can move straight. In addition, when the rotating shafts of the first traveling motor and the second traveling motor are simultaneously rotated at different speeds, the controller may turn the cleaner main body 110 to the left or right side. The controller may drive one of the first traveling motor and the second traveling motor and stop the other so as to turn the cleaner main body 110 to the left or right.

A suspension unit or assembly may be installed inside the cleaner main body 110. The suspension unit may include a coil spring. The suspension unit may absorb shock and vibration transmitted from the wheel assembly 150 during travel of the cleaner main body 110 by using an elastic force of the coil spring. For example, the suspension unit may absorb a shock when the cleaner 100 travels over an uneven floor surface or bump in the floor.

Further, the suspension unit may be provided with an elevating unit or a height adjuster to adjust the height of the cleaner main body 110. The elevating unit can be vertically movably installed in the suspension unit and can be coupled to the cleaner 100. Therefore, when the elevating unit is moved upward from the suspension unit, the cleaner main body 110 of the cleaner 100 can be moved upward together with the elevating unit. When the elevating unit is moved downward from the suspension unit, the cleaner main body 110 of the cleaner 100 can be moved downward together with the elevating unit. The cleaner 100 may be vertically moved by the elevating unit to adjust the height.

When the cleaner main body 110 travels on a hard floor, the bottom surface of the cleaning nozzle 120 may move while being in close contact with the floor surface so that the floor surface can be cleaned. However, when a carpet is laid on the floor surface to be cleaned, slipping may occur in the wheel of the wheel assembly 150 so that the traveling performance of the cleaner main body 110 may be reduced. In addition, the traveling performance of the cleaner main body 110 may be reduced due to a force from sucking the carpet by the cleaning nozzle 120.

However, since the elevating unit may adjust the height of the cleaner main body 110 according to a slip rate or a rotation speed of the wheel of the wheel assembly 150, a degree of contact between a bottom surface of the cleaning nozzle 120 and the surface to be cleaned can be adjusted so that the traveling performance of the cleaner main body 110 can be maintained regardless of the material of the surface to be cleaned. The "slip rate" may be calculated based on a sudden change in a rotational speed of the wheel of the wheel assembly 150, or based on a comparison of a rotational speed of the wheel and a linear speed of the cleaner main body 110.

Meanwhile, if the wheel of the wheel assembly 150 provided in the left side of the cleaner main body 110 is coupled to the first traveling motor through the first gear, and if the wheel of the wheel assembly 150 provided in the right side of the cleaner main body 110 is coupled to the second traveling motor through the second gear, when the user desires to move the cleaner main body 110 in the manual mode in a state in which the first traveling motor and the second traveling motor are stopped, both the wheels of the left and right wheel assemblies 150 can not be rotated. Therefore, in the manual mode of the cleaner main body 110, the wheels of the left and right wheel assemblies 150 and the first and second traveling motors may be disconnected. A clutch may be provided inside the cleaner main body 110 to connect the wheels of the left and right wheel assemblies 150 and the first and second traveling motors when the cleaner main body 110 is in the automatic mode, and to disconnect the wheels of the left and right wheel assemblies 150 and the first and second traveling motors when the cleaner main body 110 is in the manual mode.

The cleaner main body 110 may be equipped with a battery (not shown) that supplies power to electrical components of the cleaner 100. The battery may be configured to be chargeable and detachable from the cleaner main body 110.

The cleaner main body 110 may be provided with a dust container accommodating unit or a dust container holder 112, and the dust container 140 that separates and collects dust in the sucked air may be detachably coupled to the dust container accommodating unit 112.

The dust container accommodating unit 112 may be a cavity or recess of the main body 110. The dust container accommodating unit 112 may have a shape opened toward a front or top of the cleaner main body 110 and may be recessed or indented from the front F side of the cleaner main body 110 to the rear R side. The dust container accommodating unit 112 may be formed such that the front side, the upper side U, and the lower side D of a front portion of the cleaning body 110 are opened. However, the dust container accommodating unit 112 may be formed in other positions (e.g., behind the cleaner main body 110) depending on the type of the cleaner.

The dust container 140 may be detachably coupled to the dust container accommodating unit 112. A part or portion (e.g., a rear) of the dust container 140 may be accommodated or docked in the dust container accommodating unit 112, and another part or portion (e.g., a front) of the dust container 140 may protrude toward the front of the cleaner main body 110.

The dust container 140 may have an inlet 142 through which dust-containing air is introduced and an outlet 143 through which dust-separated or filtered air is discharged. When the dust container 140 is installed in the dust container accommodating unit 112, the inlet 142 and the outlet 143 may be configured to communicate with a first opening 116 and a second opening 117 formed in the inner lateral side wall of the dust container accommodating unit 112, respectively.

An intake flow path formed in the cleaner main body 110 may correspond to a flow path ranging from the cleaning nozzle 120 to the first opening 116, and an exhaust flow path may correspond to a flow path ranging from the second opening 117 to an exhaust port. Based on such a configuration, the dust-containing air introduced through the cleaning nozzle 120 may flow into the dust container 140 through the intake air flow path inside the cleaner main body 110, and may pass through at least one filtering unit or filter (e.g., a cyclone, a filter, etc.) to separate the air and the dust from each other. The dust may be collected in the dust container 140 and the air may be discharged from the dust container 140, and then finally discharged to the outside through the exhaust port via the exhaust flow path inside the cleaner main body 110.

The cleaner main body 110 may be provided with a dust container cover or cover 190 covering the dust container 140 accommodated in the dust container accommodating unit 112. The dust container cover 190 may also be referred to as a lid. The dust container cover 190 may be hinged at a side or rear of the cleaner main body 110 to be rotatable or pivotable. The dust container cover 190 may cover an opened upper side or top of the dust container accommodating unit 112 and may cover the upper side or top of the dust container 140. In addition, the dust container cover 190 may be configured to be detachable or unhinged from the cleaner main body 110.

The separation of the dust container 140 from the dust container accommodating unit 112 may be restricted in a state in which the dust container cover 190 is provided to cover the dust container 140. The dust container cover 190 may be rotatably coupled to the cleaner main body 110 by a hinge 194. The hinge 194 may be provided such that the dust container cover 190 can be rotated or pivoted via the hinge 194 about an axis parallel to the horizontal direction (e.g., the left-right direction LeRi).

The dust container cover 190 may be composed of a single component, or the dust container cover 190 may include an upper dust container cover or an upper cover 191 and a lower dust container cover or a lower cover 192. The upper and lower dust container covers 191 and 192 may also be referred to as upper and lower lids 191 and 192, respectively. The configuration of the dust container cover 190 will be described later.

A coupling protrusion such as a hook or latch (not shown) may protrude from the bottom surface of the dust container cover 190, and a coupling groove 141 to which the coupling protrusion is inserted into and coupled may be formed in the upper surface of the dust container 140. When the dust container cover 190 covers the upper side of the dust container accommodating unit 112, the coupling protrusion may be inserted into the coupling groove 141. Accordingly, the dust container 140 may be coupled to the dust container cover 190 to be secured in the dust container accommodating unit 112 and may not be removable from the cleaner main body 110. On the other hand, when the dust container cover 190 opens or is lifted from the upper side of the dust container accommodating unit 112, the coupling protrusion may come out of the coupling groove 141 so that the dust container 140 may be disconnected and released from the dust container cover 190 and can be detached from the cleaner main body 110.

A handle 114 may be provided in the upper end or top of the dust container cover 190. The handle 114 may be provided with a photographing unit or an image-capturing device (e.g., camera) 115. At this time, the photographing unit 115 may be provided to be inclined with respect to the bottom surface of the cleaner main body 110 so that the photographing unit 115 can photograph both the front side and the upper side together.

The photographing unit 115 may be provided in the cleaner main body 110 to photograph an image for simultaneous localization and mapping (SLAM) of the cleaner. The image photographed by the photographing unit 115 is used to generate a map of the traveling area or to detect the current position in the traveling area.

The photographing unit 115 may generate three-dimensional coordinate information related to the surroundings of the cleaner main body 110. The photographing unit 115 may be a 3D Depth Camera that calculates the distance between the cleaner 100 and an object to be photographed. Accordingly, field data for three-dimensional coordinate information may be generated.

The photographing unit 115 may photograph or capture a two-dimensional image related to the surroundings of the cleaner main body 110, and may generate a plurality of three-dimensional coordinate information corresponding to the photographed two-dimensional image. In an embodiment, the photographing unit 115 may include two or more cameras that obtain an existing two-dimensional image, and may achieve a stereoscopic vision scheme that generates three-dimensional coordinate information by combining two or more images obtained from two or more cameras.

The photographing unit 115 may include a first pattern irradiating unit or a first pattern emission device that irradiates light of a first pattern downward toward the front side of the cleaner main body 110, a second pattern irradiating unit or a second pattern emission device that irradiates light of a second pattern upward toward the front side of the cleaner main body 110, and an image acquiring unit or an image acquisition device to acquire an image of the front side of the cleaner main body 110. Thus, the image acquiring unit may acquire an image of an area to which light of the first pattern and light of the second pattern are emitted.

In another embodiment, the photographing unit 115 may include an infrared ray pattern irradiating unit or an infrared ray pattern projector to irradiate an infrared ray pattern together with a single camera, and to capture the shape of the infrared ray pattern, irradiated by the infrared ray pattern irradiating unit, projected onto an object to be photographed so that the distance between the photographing unit 115 and the object to be photographed can be measured. The photographing unit 115 may be an Infra Red (IR) type photographing unit 115.

In another embodiment, the photographing unit 115 may include a light emitting unit or a light emitting device that emits light or a laser beam together with a single camera, may receive a part of the laser beam emitted from the light emitting unit and reflected from the object to be photographed, and may analyze the received laser beam, so that the distance between the photographing unit 115 and the object to be photographed can be measured. The photographing unit 115 may be a time-of-flight (TOF) type photographing unit 115.

The laser of the photographing unit 115 may be configured to irradiate a laser beam extending in at least one direction. In one example, the photographing unit 115 may include first and second (e.g., uppermost and lowermost) lasers, and the first laser may irradiate linear laser beams intersected with each other and the second laser may irradiate a single linear laser beam. According to this, the lowermost laser may be used to detect obstacles in the floor, the uppermost laser may be used to detect obstacles in the upper portion, and an intermediate laser between the lowermost laser and the uppermost laser may detect an obstacle in the middle portion.

The sensing unit 130 may be provided below the dust container cover 190 and may be detachably coupled to the dust container 140. The sensing unit 130 may be provided in the cleaner main body 110 and may detect information related to the environment where the cleaner main body 110 is positioned. The sensing unit 130 may detect information related to the environment to generate field data.

The sensing unit 130 may detect surrounding features (including obstacles) so that the cleaner 100 does not collide with an obstacle. The sensing unit 130 may sense information on the outside of the cleaner 100. The sensing unit 130 may detect a user in the vicinity of the cleaner 100. The sensing unit 130 may detect an object in the vicinity of the cleaner 100.

In addition, the sensing unit 130 is configured to be able to accomplish panning (move to left and right) and tilting (provided to be inclined up and down) in order to improve a detecting function of the cleaner and the traveling function of the robot cleaner.

The sensing unit 130 is provided in the front side of the cleaner main body 110 and provided between the dust container 140 and the handle 114. The sensing unit 130 may include at least one of an external signal sensor, an obstacle sensor, a cliff sensor, a lower camera sensor, an upper camera sensor, an encoder, a shock sensor, and a microphone.

The external signal sensor can detect an external signal of the cleaner 100. The external signal sensor may be, for example, an infrared ray sensor, an ultrasonic sensor, a Radio Frequency (RF) sensor, or the like. Thus, field data for the external signal may be generated.

The cleaner 100 may receive a guide signal generated by a charging signal by using the external signal sensor and detect information on the position and the direction of the charging base. At this time, the charging base may transmit a guide signal indicating the direction and the distance so that the cleaner 100 can return. The cleaner 100 may receive a signal transmitted from the charging base, determine the current position, and set the moving direction so that it can return to the charging base.

The obstacle sensor can detect an obstacle ahead. Thus, field data for the obstacle may be generated. The obstacle sensor may detect an object existing in the moving direction of the cleaner 100 and may transmit the generated field data to the controller. The obstacle sensor can detect protrusions existing on the moving path of the cleaner 100, furnishings in the house, furniture, wall, wall corner, and the like, and transmit the field data to the controller.

The obstacle sensor may be, for example, an infrared sensor, an ultrasonic sensor, a radio frequency (RF) sensor, a geomagnetic sensor, and the like. The cleaner 100 may use one type of sensor as an obstacle sensor or use two or more types of sensors together as needed.

The cliff sensor can detect obstacles on the floor supporting the cleaner main body 110 by mainly using various types of optical sensors. Thus, field data for an obstacle on the floor may be generated. The cliff sensor may be, like an obstacle sensor, an infrared sensor having a light emitting unit and a light receiving unit, an ultrasonic sensor, an RF sensor, a position sensitive detector (PSD) sensor, or the like.

For example, the cliff sensor may be a PSD sensor, but it may be composed of a plurality of different types of sensors. The PSD sensor may have a light emitting unit or device that emits infrared rays to an obstacle, and a light receiving unit or a light sensor that receives infrared rays that are reflected from the obstacle and is returned, and is generally configured in the form of a module. When an obstacle is detected by using the PSD sensor, a stable measurement value can be obtained irrespective of the reflectance and the color difference of the obstacle.

The controller may measure an infrared angle between a light emitting signal of the infrared ray emitted by the cliff sensor toward the ground and a reflection signal received after being reflected by the obstacle so that it can detect a cliff or drop-off and acquire the field data of the depth.

A lower camera sensor may acquire image information (field data) about the surface to be cleaned while the cleaner 100 is moving. The lower camera sensor may also be referred to as an optical flow sensor. The lower camera sensor may convert a lower side image inputted from an image sensor provided in the sensor to generate image data (field data) of a certain format. Field data for an image recognized through the lower camera sensor can be generated.

By using the lower camera sensor, the controller may detect the position of the cleaner 100 irrespective of the slip of the cleaner 100. The controller may compare and analyze the image data photographed by the lower camera sensor according to time and calculate the movement distance and the movement direction, and calculate the position of the cleaner 100 based on the calculated movement distance and the movement direction.

An upper camera sensor or a camera may be installed to face the upper side or the front side of the cleaner 100 to photograph the vicinity of the cleaner 100. When the cleaner 100 includes a plurality of upper camera sensors, the camera sensors may be formed in the upper side or lateral side surface of the mobile robot at a certain distance or at a certain angle. Field data for an image recognized through the upper camera sensor may be generated.

The encoder may detect information related to the operation of the motor that drives the wheel of the wheel 150. Thus, field data on the operation of the motor may be generated. The shock sensor may detect a shock when the cleaner 100 collides with an external obstacle or the like. Thus, field data on an external shock may be generated. The microphone may detect an external sound. Accordingly, field data for the external sound may be generated.

In the present embodiment, the sensing unit 130 may include an image sensor. In the present embodiment, the field data may be image information acquired by the image sensor or feature point information extracted from the image information, but it is not necessarily limited thereto.

Meanwhile, a cable adaptor or an adapter (not shown) may be provided in the open lower side of the dust container accommodating unit 112. The cable adaptor may be coupled to the cleaner main body 110 to form a part of the cleaner main body 110. When the cable adaptor is coupled to the cleaner main body 110, the cable adaptor may be considered as the same configuration as that of the cleaner main body 110. The dust container 140 that stores foreign matter may be placed on the cable adaptor. The cable adaptor may connect the cleaner main body 110 and the cleaning nozzle 120. The cable adaptor may connect the intake flow path of the cleaner main body 110 and the intake flow path of the cleaning nozzle 120.

The cleaning nozzle 120 may be configured to suck the dust-containing air or to wipe the floor. Here, a cleaning nozzle 120 that sucks the dust-containing air may be referred to as a suction module or a suction head, and a cleaning nozzle 120 to wipe the floor may be referred to as a mop module or a mop head.

The cleaning nozzle 120 may be detachably coupled to the cleaner main body 110. When the suction module is detached from the cleaner main body 110, the mop module may be detachably coupled to the cleaner main body 110 in place of the detached suction module. Accordingly, when a user desires to remove the dust on the floor, the suction module may be mounted in the cleaner main body 110, and when the user desires to wipe the floor, the mop module may be mounted in the cleaner main body 110. Alternatively, the cleaning nozzle 120 may be configured to both suction dust-containing air and also to mop the floor. The cleaning nozzle 120 may be configured to have a function of wiping the floor after sucking the dust-containing air.

The cleaning nozzle 120 may be provided below the cleaner main body 110 or may protrude from one side of the cleaner main body 110 as shown in the drawings. One side of the cleaner main body 110 may be a side in which the cleaner main body 110 travels in the forward direction, i.e., the front portion of the cleaner main body 110. The cleaning nozzle 120 may be provided forward of the wheel assembly 150, and a part of the cleaning nozzle 120 may protrude forward of the dust container 140.

In the drawing, it is shown that the cleaning nozzle 120 may protrude from one side of the cleaner main body 110 to the front side and to both the left and right sides. A front end portion of the cleaning nozzle 120 may be provided in a position spaced forward from one side of the cleaner main body 110, and the left and right end portions of the cleaning nozzle 120 may be provided to be spaced apart from one side of the cleaner main body 110 to the left and right sides of the cleaner main body 110.

A suction motor may be installed inside the cleaner main body 110. An impeller (not shown) may be coupled to a rotating shaft of the suction motor. When the suction motor is driven so that the impeller is rotated together with the rotating shaft, the impeller can generate a suction force. An intake flow path may be formed in the cleaner main body 110. Foreign matter such as dust flows into the cleaning nozzle 120 from the surface to be cleaned by the suction force generated by the driving force of the suction motor, and the foreign matter introduced into the cleaning nozzle 120 may be introduced into the intake flow path.

The cleaning nozzle 120 may clean the floor surface to be cleaned when the cleaner main body 110 travels in the automatic mode. The cleaning nozzle 120 may be provided adjacent to the floor surface among the front side surface of the cleaner main body 110. A suction port to suction air may be formed on the bottom surface of the cleaning nozzle 120. When the cleaning nozzle 120 is coupled to the cleaner main body 110, the suction port may be provided toward the floor surface.

The cleaning nozzle 120 may be coupled to the cleaner main body 110 through the cable adaptor. The cleaning nozzle 120 may communicate with the intake flow path of the cleaner main body 110 through the cable adaptor. The cleaning nozzle 120 may be provided below the dust container 140 provided in the front portion of the cleaner main body 110.

The cleaning nozzle 120 may include a case having the suction port formed in a bottom surface thereof, and a brush unit or assembly may be rotatably installed in the case. The case may provide an empty space so that the brush unit can be rotatably installed therein. The brush unit may include a rotating shaft formed to extend in the left and right direction and a brush protruded to an outer circumference of the rotating shaft. The rotating shaft of the brush unit may be rotatably coupled to the left and right side surfaces of the case.

The brush unit may be provided such that the brush protrudes through the suction port formed in the bottom of the case. When the suction motor is driven, the brush unit may be rotated by the suction force and can sweep upward dust and other foreign matter on the floor surface to be cleaned. The swept foreign matter may be sucked into the case by the suction force. The brush may be formed of a material that does not generate triboelectricity or static electricity so that foreign matter can not easily adhere thereto.

The cable adaptor may be coupled to the front surface of the cleaner main body 110. The cable adaptor may connect the cleaner main body 110 and the cleaning nozzle 120. The cleaning nozzle 120 may be detachably coupled to the cable adaptor. The cable adaptor can support the lower side of the dust container 140.

The dust container 140 may be detachably coupled to the front surface of the cleaner main body 110, and the lower side may be supported by the cable adaptor. The dust container 140 may include a hollow cylindrical case. In the interior of the cylindrical case, a filter unit or filter that separates foreign matter and air from the air sucked through the intake flow path of the cleaner main body 110 may be provided.

The filter unit may include a plurality of cyclones. Foreign matter including the dust filtered in the filter unit may be dropped and accommodated in the dust container 140. Only air may be discharged outside the dust container 140, and moved to the suction motor side by the suction force of the suction motor, and then may be escaped to the outside of the body 110.

The lower side of the dust container 140 may be opened and the lower side of the opened dust container 140 may be covered by a lid or bottom surface 145. The lid 145 may also be referred to as a lower lid. One side of the lid 145 may be rotatably coupled to the dust container 140 to be opened and closed. When the lid 145 is opened, the opened lower side of the dust container 140 may be opened, and the foreign matter accommodated in the dust container 140 may be dropped through the opened lower side of the dust container 140. The user may separate the dust container 140 from the cleaner main body 110 and then open the lid to discard the foreign matter accommodated in the dust container 140. When the dust container 140 is coupled to the cleaner main body 110, the dust container 140 is placed on the cable adaptor. The lid or bottom surface 145 of the dust container 140 is placed on the upper side of the cable adaptor.

As described above, the cleaning nozzle 120 may be provided in a state of being in close contact with the floor surface to be cleaned, so that the floor surface can be automatically cleaned when the cleaner main body 110 travels in the automatic mode. However, when a user desires to manually perform the cleaning, the user may input a manual mode travel of the cleaner main body 110 through the mode selection input unit provided in the cleaner main body 110, and then detach the cleaning nozzle 120 from the cleaner main body 110, and may couple a manual cleaning nozzle to the cleaner main body 110 to perform manual cleaning. The manual cleaning nozzle may include a long hose in the form of a bellows. In this case, the hose portion of the manual cleaning nozzle may be coupled to the cleaner main body 110.

Meanwhile, the cleaner 100 according to the embodiment of the present invention may relatively rotate the sensing unit 130 with respect to the dust container cover 190, thereby detecting an obstacle in the left and right direction quickly and accurately. Hereinafter, the sensing unit 130, a sensor rotation module or assembly, and the dust container cover 190 to which the sensing unit 130 and the sensor rotation module are coupled will be described in detail.

Figure 5:
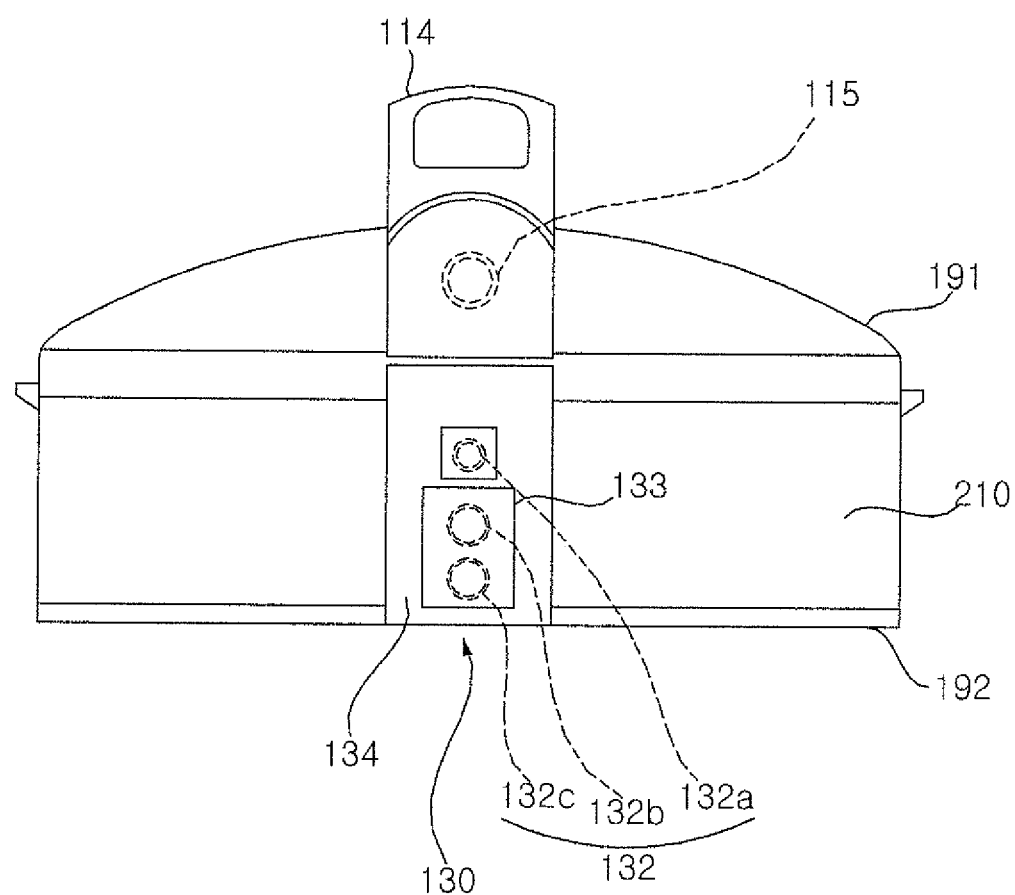
FIG. 5 is a front view of the dust container cover of FIG. 3.
Figure 6:
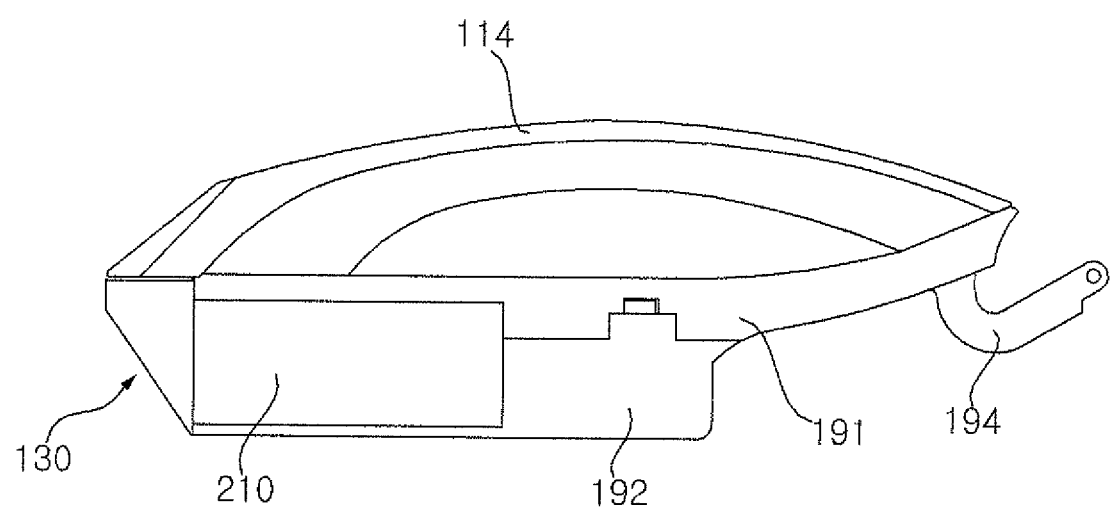
FIG. 6 is a side view of the dust container cover of FIG. 3.
Figure 7:
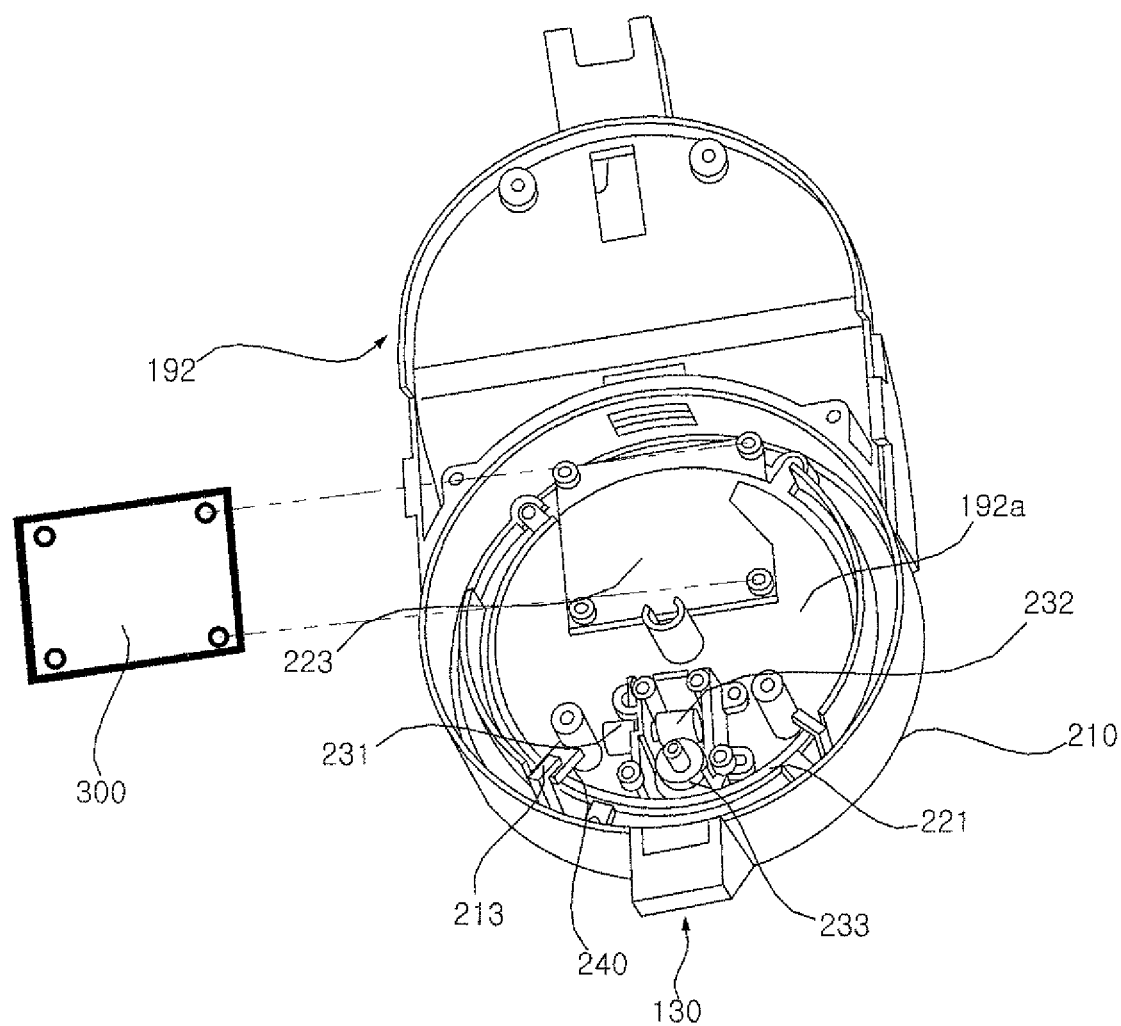
FIG. 7 is a perspective view of the dust container cover of FIG. 3 an upper dust container cover is removed.
Figure 8:
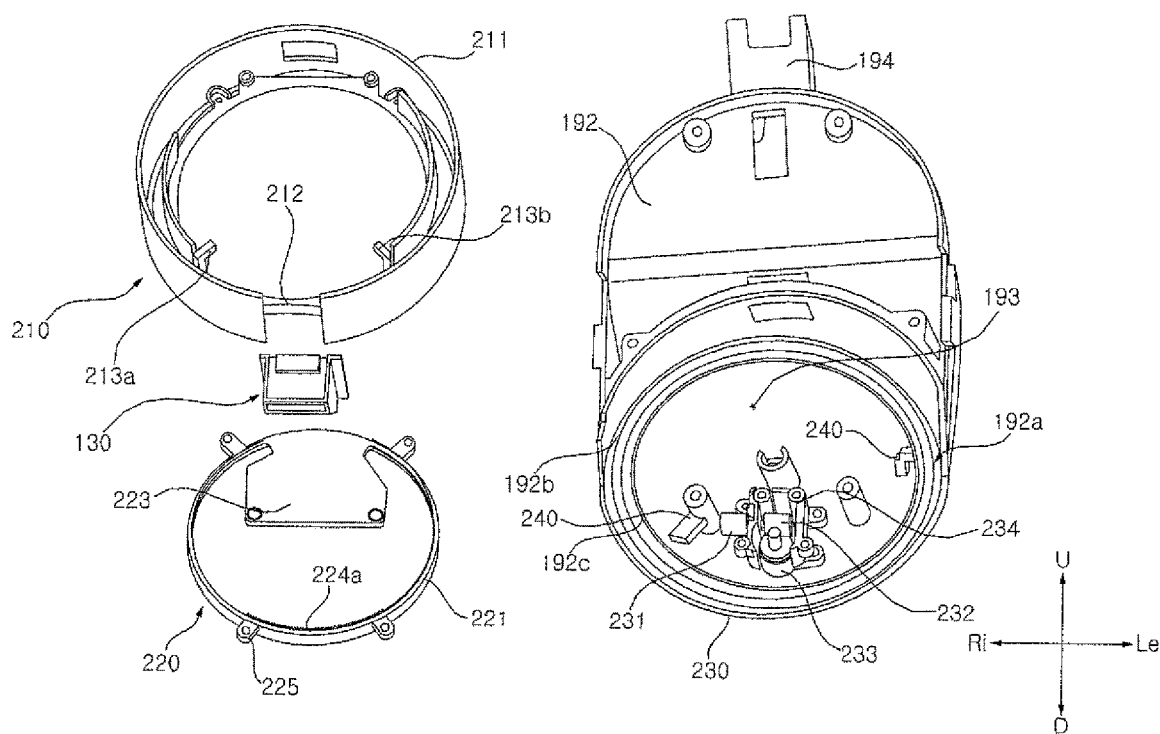
FIG. 8 is an exploded perspective view of the dust container cover of FIG. 3 where an upper dust container cover is removed.

Referring to FIG. 3 to FIG. 9, the sensing unit 130 may be provided along a vertical or longitudinal direction on the lateral side surface of the cleaner main body 110. The sensing unit 130 may include a first laser 132a, a second laser 132b, and a camera 132c (FIG. 5). The first laser 132a, the second laser 132b, and the camera 132c may constitute a detector or sensor 132 of the sensing unit 130.

The first laser 132a irradiates a laser or a laser beam toward the front lower side of the cleaner 100 and the second laser 132b irradiates laser or a laser beam toward the front upper side of the cleaner 100. The first laser 132a and the second laser 132b may be provided in a line along the vertical direction. In the drawing, it is shown that the second laser 132b is provided below the first laser 132a.

The camera 132c may be configured to photograph the laser beams irradiated by the first laser 132a and the second laser 132b within a preset photographing area. The preset photographing area includes an area ranging from the floor to an upper end of the cleaner 100. Therefore, an obstacle ahead of the cleaner 100 may be detected, and a collision or catching between the cleaner 100 and the obstacle can be prevented.

The set photographing area may be, for example, an angle of view of 105 degrees in an up and down direction (i.e., the vertical direction), an angle of view of 135 degrees in a left and right direction (i.e., a horizontal direction), and an area within 25 meters. The preset photographing area may be changed by various factors such as the installation position of the first and second lasers 132a and 132b, the irradiation angle of the first and second lasers 132a and 132b, the height of the cleaner 100, etc.

The first laser 132a, the second laser 132b, and the camera 132c may be provided in a line along the vertical direction of the cleaner main body 110. In the drawing, it is shown that the camera 132c is provided below the second laser 132b.

The first laser 132a may be provided downwardly inclined with respect to the lateral side surface of the cleaner main body 110, and the second laser 132b may be provided upwardly inclined with respect to the lateral side surface of the cleaner main body 110.

The sensing unit 130 may further include a window unit or a window 133 and a case 134. The window unit 133 may be provided to cover the first laser 132a, the second laser 132b, and the camera 132c, and may have a transparency. Here, the term "transparency" means a property of transmitting at least a part of incident light, and includes a concept of semi-transparency or translucency.

The window unit 133 may be formed of a synthetic resin material or a glass material. When the window unit 133 is semi-transparent, a material of the window unit 133 itself may be formed to have semi-transparency, or the material itself may be formed to have transparency and a film attached to the material may have semi-transparency.

The case 134 may be mounted in a rotation module described later, and may be configured to fix the first laser 132a, the second laser 132b, the camera 132c, and the window unit 133. As shown, the case 134 may be configured to accommodate at least a part of the window unit 133. The case 134 may be formed of a synthetic resin material or a metal material, and may be opaque.

Although the angle of view in the left and right direction (i.e., the horizontal direction) of the sensing unit 130 may be 135 degrees, when the left and right ends of an obstacle are partially recognized, the sensing unit 130 may not determine whether there is an obstacle, and may not determine the obstacle quickly and accurately during the rotation motion or direction change of the cleaner 100 due to the narrow angle of view. In order to solve such a problem, the embodiment can rotate the sensing unit 130 in the left-right direction through the rotation module.

The dust container cover 190 may have a space in which a sensor bracket or a bracket 210 is installed to be exposed to at least a front side or to the front side and the lateral side. The sensor bracket 210 may fix to or secure the sensing unit 130, and may also be referred to as a sensor housing or rotation housing.

The dust container cover 190 may include a lower dust container cover or a lower cover 192 hinged to the cleaner main body 110, an upper dust container cover or an upper cover 191 which is coupled to the lower dust container cover 192 and coupled to the handle 114, and a rotation module accommodating unit or a rotation assembly holder 193 which accommodates a rotation module or assembly between the lower dust container cover 192 and the upper dust container cover 191.

The lower dust container cover 192 may be coupled to the upper dust container cover 191, and may define at least a part of the lower side and lateral side appearances of the dust container cover 190. A hinge 194 (FIG. 4) may be formed in the lower dust container cover 192. Together with the upper dust container cover 191, the lower dust container cover 192 may define the rotation module accommodating unit 193 that accommodates the rotation module. The upper dust container cover 191 may be coupled to an upper portion of the lower dust container cover 192, and may define a part of the upper side and lateral side appearances of the dust container cover 190.

The rotation module accommodating unit 193 may accommodate a rotation module between the lower dust container cover 192 and the dust container cover 190. The rotation module accommodating unit 193 may be formed in a shape having at least a front side opened. The rotation module accommodating unit 193 can be defined by a lower portion of the upper dust container cover 191 being recessed from the front end to the center, and an upper portion of the lower dust container cover 192 being recessed from the front end to the center.

The rotation module accommodating unit 193 may include a mounting unit or mount 192*b* (FIG. 8) in which the rotation module is mounted, and a guide rail 192*a* which is formed in the mounting unit 192*b* and guides a rotation guide 220 of the rotation module. The rotation module accommodating unit 193 may further include an inner rim or partition 192*c* separating the mounting unit 192*b* and the guide rail 192*a* from the plurality of gears provided on a base 230 of the rotation module accommodating unit 193.

The mounting unit 192*b* may be formed in the lower dust container cover 192, and may be in the form of a plate which is opened frontward and laterally. It may have a circular or rounded shape corresponding to the sensor bracket 210 of the rotation module. A driving motor or a motor 231 of the rotation module may be provided at or near the center of the mounting unit 192*b*. A rear portion of the mounting unit 192*b* may be provided such that a part of the lower dust container cover 192 protrudes upward to enclose a part of a lateral side surface of the sensor bracket 210.

The guide rail 192*a* may be provided in a rim of the mounting unit 192*b*. The guide rail 192*a* may define a circle track or arc around an axis parallel to the vertical direction in the lower dust container cover 192. In other words, the guide rail 192*a* may be curved, circular, or semicircular. The rotation guide 220 may be slidably coupled to the guide rail 192*a*. The guide rail 192*a* may be a groove, a protrusion, or the like formed in the lower dust container cover 192.

The sensing unit 130 and the rotation module may be constrained by the rotation or pivoting of the dust container cover 190 about the hinge 194 and rotated together. An axis around which the sensing unit 130 pans together with the sensor bracket 210 may be perpendicular to an axis around which the dust container cover 190 rotates to engage with and disconnect from the dust container 140. For example, the sensing unit 130 may pan with the sensor bracket 210 around a vertical axis, and the sensing unit 130 may rotate with the entire dust container cover 190 via the hinge 194 around a horizontal axis.

The rotation module may rotate the sensing unit 130 relatively with respect to the dust container cover 190. The sensing unit 130 and the rotation module may be provided between the dust container 140 and the handle 114. The rotation module may tilt or pan the sensing unit 130 from side to side relatively with respect to the cleaner main body 110. The tilt or pan angle of the sensing unit 130 may be 45 degrees toward left and right sides respectively around the front.

The rotation module may be provided between a part of the upper dust container cover 191 and a part of the lower dust container cover 192, and the entire rotation module may be provided to be overlapped with a part of the upper dust container cover 191 and a part of the lower dust container cover 192 in the vertical direction and the front-rear direction.

The sensing unit 130 may be provided to protrude forward of the dust container cover 190 and the cleaner main body 110 so that the angle of view can be prevented from being obscured by the cleaner 100 when detecting the surrounding environment. The sensing unit 130 may be positioned forward or in front of the rotation module.

For example, the rotation module may include a driving motor or a motor 231 which supplies a driving force and is fixed to the dust container cover 190, a sensor bracket 210 which is rotated by receiving the driving force of the driving motor 231 and accommodates at least a part of the sensing unit 130, and a rotation guide 220 which is fixed to the sensor bracket 210 and is rotatably coupled to the dust container cover 190.

The driving motor 231 may supply a driving force to the rotation guide 220 and/or the sensor bracket 210 and may be fixed to the dust container cover 190. The driving motor 231 may be provided in the mounting unit 192*b* in the lower dust container cover 192. The driving motor 231 may be positioned inside a circle or within an arc formed by the guide rail 192*a* in the lower dust container cover 192.

The rotation module may include at least one gear that transmits the rotational force of the driving motor 231 to the sensor bracket 210. When the sensor bracket 210 is coupled to the rotation guide 220, the gear may transmit the rotational force of the driving motor 231 to the rotation guide 220.

A plurality of gears may be named as a gear assembly. The driving motor 231 may generate a rotational force about a rotating shaft parallel to the horizontal direction, and the rotation guide 220 may be rotated about a rotating shaft parallel to the vertical direction.

The gear assembly may include a worm gear 232 which is coupled to a rotating shaft of the driving motor 231, a spur gear 233 which is engaged with the worm gear 232, and an internal gear 234 which is engaged with the spur gear 233 and formed in the rotation guide 220. The spur gear 233 may rotate about the vertical direction as a rotating shaft, and the internal gear 234 may rotate about the vertical direction as a rotating shaft.

The rotation guide 220 may be fixed to the sensor bracket 210, and may be rotatably coupled to the dust container cover 190. The sensor bracket 210 may be constrained by the rotation of the rotation guide 220 and rotated together. The rotation guide 220 may be formed integrally with the sensor bracket 210.

The sensor bracket 210 may be coupled to the upper portion of the rotation guide 220. The rotation guide 220 may guide a rotation path of the sensor bracket 210 and the sensing unit 130.

For example, the rotation guide 220 may be a ring shape that is slidably coupled with the guide rail 192*a* of the dust container cover 190 or a shape defining a part of a ring shape (i.e., a circular or semi-circular shape). The rotation guide 220 may include a guide main body 221 defining a circle track, at least one boss 225 protruding radially from the guide main body 221, and a substrate supporting unit or a circuit board support 223 extending in a center or radial direction from the guide main body 221. The guide main body 221 may be secured to the sensor bracket 210 via the at least one boss 225 using, e.g., bolts, screws, or pins. The guide main body 221 may have a circular or ring shape.

The guide main body 221 may be slidably coupled with the guide rail 192a of the lower dust container cover 192. The guide main body 221 may be a ring or circle having an axis which is the vertical direction (i.e., a vertical axis), and may be rotated about the vertical axis.

The substrate supporting unit 223 may support a circuit board 300 (FIG. 7) electrically connected to the sensing unit 130. When the circuit board 300 is supported by the rotation guide 220, the sensing unit 130 may rotate together with the circuit board 300. Thus, even when the sensing unit 130 rotates, the possibility of a disconnection between the circuit board 300 and the sensing unit 130 may be reduced. The circuit board 300 may be coupled to the rotation guide 220 and constrained by the rotation of the rotation guide 220 to be rotated together with the rotation guide 220.

The rotation guide 220 may be provided with an internal gear 224a to receiving the driving force of the driving motor 231. The internal gear 224a may be formed on at least a part of the inner circumferential surface of the guide main body 221. The internal gear 224 may have a length corresponding to a turning radius of the guide main body 221. The internal gear 224a may be engaged with the spur gear 233.

The spur gear 233 may be rotated by the driving force of the driving motor 231. When the spur gear 233 is rotated, the rotation guide 220 coupled to the internal gear 224a may be rotated. When the rotation guide 220 is rotated, the sensor bracket 210 and the sensing unit 130 constrained to the rotation guide 220 may be rotated.

The sensor bracket 210 may be coupled to the sensing unit 130. The sensor bracket 210 may restrain the sensing unit 130 such that the sensing unit 130 is exposed to the outside of the sensor bracket 210. The sensor bracket 210 may be coupled to the sensing unit 130 by a hook, a fastening member, or the like.

The sensor bracket 210 may be provided to surround the driving motor 231. The driving motor 231 may be positioned inside the sensor bracket 210 so that the driving motor 231 may not be exposed to the outside. The driving motor 231 may be located inside the sensor bracket 210. The spur gear 233 and the worm gear 232 may also be positioned inside the sensor bracket 210.

The sensor bracket 210 may form at least a part of the lateral side surface of the dust container cover 190. The sensor bracket 210 may form a part of the front surface and a part of both lateral sides of the dust container cover 190. The sensor bracket 210 may be exposed to the front and lateral side surfaces of the dust container cover 190 while being rotated by the rotation guide 220.

The sensor bracket 210 may be rotated together with the rotation guide 220 while being coupled to the sensing unit 130 so that it can restrict an exposure of the rotation guide 220 and the driving motor 231. Accordingly, the rotation guide 220 may be inserted into the lower end of the sensor bracket 210.

The sensor bracket 210 may include a bracket body 211 defining at least a part of a circle track or arc, and a sensor accommodating unit or a sensor section 212 which is formed in the bracket body 211 and secures the sensing unit 130 such that the sensor unit 130 may be exposed to the outside.

The bracket body 211 may be circular or a ring. As an example, the sensing unit 130 may have a groove or insertion portion that slides over the sensor accommodating unit 212 to fasten to the sensor bracket 210, but embodiments disclosed are not limited here to, and other fastening methods of securing the sensing unit 130 to the sensor accommodating unit 212 may be used. The sensor accommodating unit 212 may be further configured to change a height of the sensor unit 130, or to allow the sensor unit 130 to tilt upward or downward.

A coupling unit (e.g., an insertion hole and a bolt, etc.) to which the circuit board 300 is coupled may be formed in the bracket body 211. At least one light blocking unit or a light blocker 213a, 213b protruding inward in comparison with the inner circumferential surface of the bracket body 211 may be formed in the bracket body 211. The at least one light blocking unit 213a, 213b may constitute a light blocking assembly 213.

The light blocking unit 213a, 213b may be detected by a sensor position detection module or a sensor position detector 240 described later that detects a position or orientation of the sensing unit 130. The light blocking unit 213a, 213b may block the light emitted from the sensor position detection module 240. The light blocking unit 213a, 213b may protrude toward a center of the bracket main body 211 from an inner circumferential surface of the bracket main body 211, and may form a partial area of a circle track or arc smaller than the inner circumferential surface of the bracket main body 211. At least two light blocking units 213a, 213b may be spaced apart from each other. The light blocking unit 213a, 213b may contain a material that blocks the light emitted from the sensor position detection module 240.

The embodiment may further include the sensor position detection module 240 that detects the position of the sensing unit 130. The sensor position detection module 240 can determine the position of the sensing unit 130 by an optical method. The sensor position detection module 240 may include a photo interrupter which is installed in the dust container cover 190 and detects the rotational position of the rotation module.

The photo interrupter may include a light emitting unit or device (not shown) that emits light to a path along which the light blocking unit 213a, 213b moves and a light receiving unit or device (not shown) to detect the light emitted from the light emitting unit. When the light blocking unit 213a, 213b is positioned in an arbitrary position, it blocks the light emitted from the light emitting unit, so that the photo interrupter can determine the position or orientation of the sensing unit 130.

The photo interrupter may be installed in the lower dust container cover 192, and the light emitting unit and the light receiving unit may be provided to overlap with a track or path in which the light blocking unit 213a, 213b moves in a direction intersecting the track.

Figure 9:
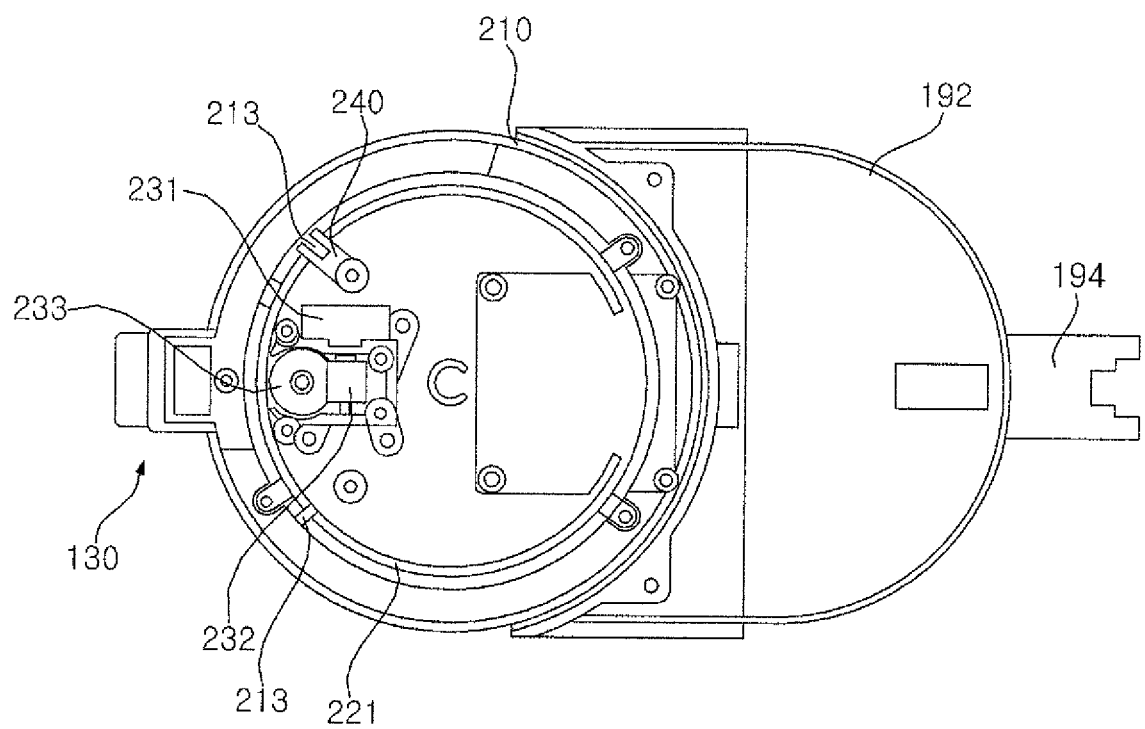
FIG. 9 is a plan view of the dust container cover of FIG. 3 where an upper dust container cover is removed.
Figure 10:
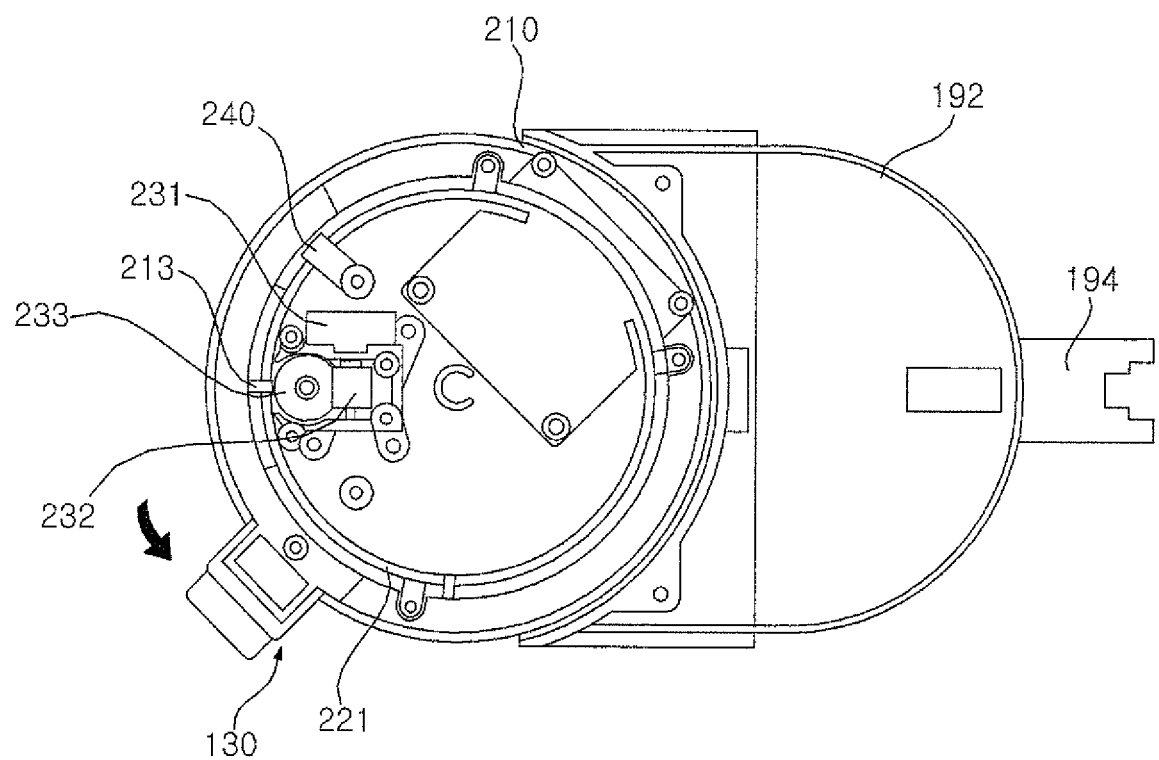
FIG. 10 is a view showing a state in which a sensing unit in FIG. 9 is rotated.
Figure 11:
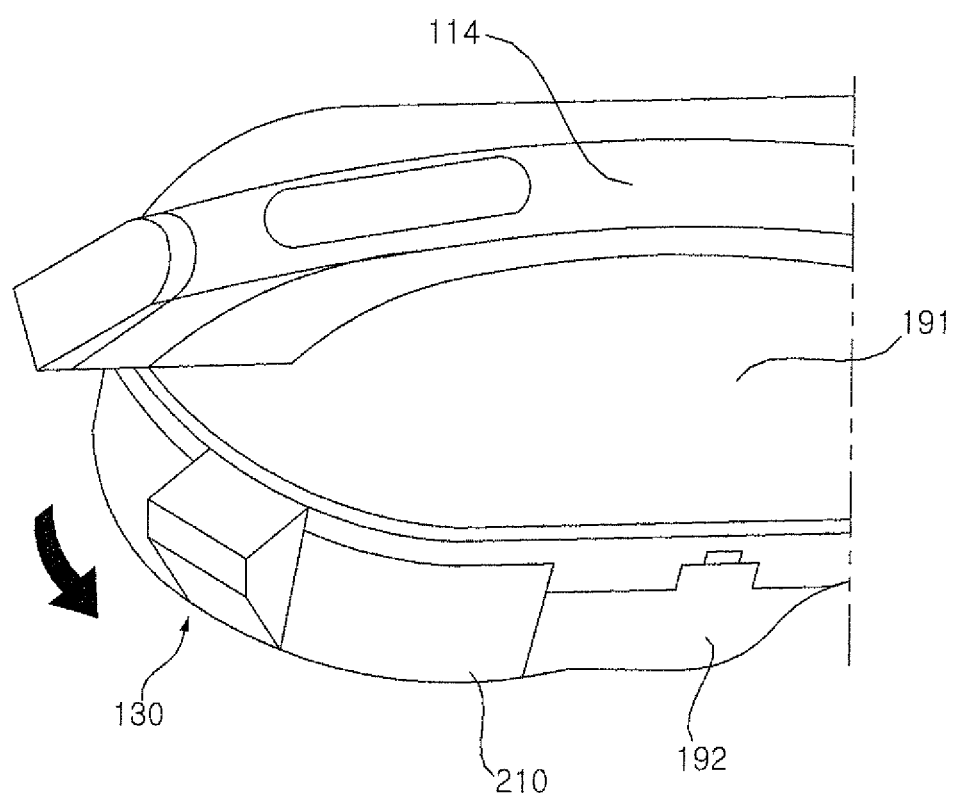
FIG. 11 is an external perspective view of a dust container cover in a state in which a sensing unit is rotated.

Referring to FIG. 9 to FIG. 11, the sensing unit 130 may be positioned to face forward from a center axis of the rotation guide 220, when the cleaner 100 travels straight or is in a normal operation. The controller may rotate the sensing unit 130 when the cleaner main body 110 rotates, changes direction, or needs to collect environment information on the lateral side.

When the driving motor 231 is rotated, the worm gear 232 and the spur gear 233 may be rotated, and the rotation guide 220 engaged with the spur gear 233 may be rotated. When the rotation guide 220 is rotated, the sensing unit 130 and the sensor bracket 210 constrained to the rotation guide 220 may be rotated together. When the rotation guide 220 is rotated, the facing direction or orientation of the sensing unit 130 is changed from the front side to the lateral side.

Even if the sensing unit 130 rotates together with the sensor bracket 210, since the sensor bracket 210 may have a ring or annular shape, the driving motor 231 and the like inside the sensor bracket 210 may not be exposed to the outside, and the dust container cover 190 and the handle 114 are not rotated. Therefore, the dust container cover 190 may be opened by holding the handle 114 even when the sensing unit 130 is positioned to face the lateral side.

A cleaner according to an embodiment is advantageous in that a sensing unit or module that detects the environment around the cleaner may be rotated at a certain angle with respect to a front so that the sensing unit has a wide sensing range in the left and right directions.

The embodiments disclosed herein are advantageous in that the sensing unit may be rotated at a certain angle with respect to the forward direction, so that it is easy to detect obstacles existing on the lateral side of the traveling direction, and when a cleaner main body or main body rotates or changes its direction, it is possible to quickly and accurately detect an obstacle existing in the rotation expected path and travel expected path of the cleaner main body.

In addition, embodiments disclosed herein are advantageous in that a sensor rotation module that fixes and rotates the sensing unit is restrained by a rotation of the dust container cover or cover, so that the sensing unit and the sensor rotation module are installed in the dust container cover without disturbing the dust container separation.

In addition, embodiments disclosed herein are advantageous in that the sensing unit and the sensor rotation module are provided between the dust container and the handle so that when the user holds the handle and separates the dust container, there is no possibility that the sensing unit is damaged by a user, and the user can separate the dust container without disturbance of the sensing unit.

In addition, the embodiments disclosed herein are advantageous in that, when the sensing unit rotates, the circuit board connected to the sensing unit by an electric signal may be rotated together, thereby reducing the possibility of disconnection between the circuit board and the sensing unit due to rotation of the sensing unit.

In addition, embodiments disclosed herein are advantageous in that a precise position control can be performed using a large gear ratio by using a plurality of gears. Further, the rotation radius of a sensor bracket or bracket to which the sensing unit is coupled is large, thereby providing a wider angle of view than the rotation of the sensing unit in place, and the angle of view of the sensing unit is not limited by the lateral side surface of the cleaner main body, and the like.

Embodiments disclosed herein have been made in view of the above problems, and provide a cleaner capable of accurately and quickly recognizing an obstacle on the lateral side of a traveling direction of a cleaner. A cleaner may be capable of accurately and quickly recognizing an obstacle on the lateral side in a change of traveling direction by previously rotating a sensor toward the traveling direction of the cleaner, when the traveling direction of the cleaner is changed.

Embodiments disclosed herein further provide a cleaner in which a sensor rotation module fixing and rotating a sensing unit may be installed in a dust container cover and may be constrained by the rotation of the dust container cover so that the sensing unit is rotated without disturbing the separation of the dust container. The problems of the present disclosure are not limited to the above-mentioned problems, and other matters not mentioned can be clearly understood by those skilled in the art from the following description.

According to embodiments disclosed herein, a cleaner may be configured to rotate a sensing unit or module relative to a dust container cover. Further, the sensing unit and a rotation module or assembly to rotate the sensing unit are provided between the handle and the dust container.

In embodiments disclosed herein may provide a cleaner that includes a cleaner main body; a dust container which is accommodated in the cleaner main body; a dust container cover which covers an upper portion of the dust container; a handle which is coupled to an upper end of the dust container cover; a sensing unit or module which detects information around the cleaner main body; and a rotation module which rotates the sensing unit relatively with respect to the dust container cover, wherein the sensing unit and the rotation module are provided between the dust container and the handle.

The rotation module may include a driving motor which supplies a driving force and is fixed to the dust container cover; a sensor bracket which is rotated by receiving the driving force of the driving motor and accommodates at least a part of the sensing unit; and a rotation guide which is fixed to the sensor bracket and rotatably coupled to the dust container cover.

The rotation module may further include at least one gear which transmits the rotational force of the driving motor to the sensor bracket. The rotation guide may be slidably coupled to a guide rail of the dust container cover.

The cleaner may further include a circuit board electrically coupled to the sensing unit. The circuit board may be coupled to the rotation guide. The circuit board may be restrained by rotation of the rotation guide and rotated together with the rotation guide.

The sensor bracket may be provided to surround the driving motor. The sensor bracket may include a bracket body which defines at least a part of a circle track and a sensor accommodating unit which is formed in the bracket body and receives the sensing unit to be exposed to the outside.

The bracket body may be provided with a light blocking unit which protrudes inwardly in comparison with an inner circumferential surface of the bracket body. The sensor bracket may form at least a part of a lateral side surface of the dust container cover.

The rotation guide may be provided with an internal gear which receives the driving force of the driving motor. The dust container cover may include a lower dust container cover which is hinged to the cleaner main body; an upper dust container cover which is coupled to the lower dust container cover and coupled to the handle; and a rotation module accommodating unit which accommodates the rotation module between the lower dust container cover and the upper dust container cover.

The cleaner may further include a sensor position detection module which detects a position of the sensing unit. The sensor position detection module may include a photo interrupter which is installed in the dust container cover and detects a rotation position of the rotation module.

The dust container cover may be rotatably hinged to the cleaner main body, and a direction of a rotating shaft of the sensing unit may intersect with a direction of a rotating shaft of the dust container cover. The dust container cover may be rotatably hinged to the cleaner main body, and the sensing unit and the rotation module may be constrained by rotation of the dust container cover and are rotated together.

Hereinabove, although the present disclosure has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

It will be understood that when an element or layer is referred to as being another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cleaner comprising:
    a main body;
    a dust container docked in the main body;
    a cover covering a top of the dust container;
    a handle provided on an upper end of the cover;
    a sensor detecting information around the main body; and
    a rotation assembly rotating the sensor relative to a lateral surface of the cover, wherein the sensor and the rotation assembly are provided between the dust container and the handle, wherein the cover is rotatably hinged to the main body, and an axis around which the sensor rotates intersects an axis around which the cover rotates.

2. The cleaner of claim 1, wherein the rotation assembly comprises:
    a motor which supplies a force and is fixed to the cover;
    a bracket which is rotated by the force of the motor and is secured to the sensor; and
    a rotation guide which is fixed to the bracket and rotatably coupled to the cover.

3. The cleaner of claim 2, wherein the rotation assembly comprises at least one gear which transmits the force of the driving motor to the bracket.

4. The cleaner of claim 3, wherein the bracket forms at least a part of the lateral surface of the cover.

5. The cleaner of claim 2, wherein the rotation guide is slideably coupled to a guide rail of the cover.

6. The cleaner of claim 5, further comprising a circuit board electrically connected to the sensor and coupled to the rotation guide.

7. The cleaner of claim 6, wherein the circuit board is restrained by a rotation of the rotation guide and rotated together with the rotation guide.

8. The cleaner of claim 2, wherein the bracket is provided to surround the motor.

9. The cleaner of claim 2, wherein the bracket further includes:
    a bracket body having a circular or semicircular shape; and a sensor section formed in the bracket body to accommodate the sensor such that the sensor is at least partially protruded from the bracket and exposed to an outside.

10. The cleaner of claim 9, wherein the bracket body is provided with a light blocker which protrudes inwardly from an inner circumferential surface of the bracket body.

11. The cleaner of claim 2, wherein the rotation guide is provided with an internal gear which receives the force of the motor.

12. The cleaner of claim 1, wherein the cover comprises:
a lower cover which is hinged to the main body;
an upper cover which is coupled to the lower cover and coupled to the handle; and
a rotation assembly holder which accommodates the rotation assembly between the lower cover and the upper cover.

13. The cleaner of claim 1, further comprising a sensor position detector which detects a position of the sensor.

14. The cleaner of claim 13, wherein the sensor position detector comprises a photo interrupter which is installed in the cover and detects a rotation position of the rotation assembly.

15. The cleaner of claim 1, wherein the cover is rotatably hinged to the main body, and wherein the sensor and the rotation assembly are constrained by a rotation of the cover and are rotated together.

16. A cleaner comprising:
a main body;
a lid coupled to the main body;
a sensor module including at least one sensor that senses information around the main body; and
a rotation assembly panning the sensor in a left-right direction with respect to the lid, wherein the rotation assembly comprises:
a motor mounted to the lid;
a rotation guide rotatably coupled to the lid and rotatable by the motor;
a housing fixed to the rotation guide and coupled to at least a part of the sensor module wherein the rotation guide is coupled to a guide rail of the lid to slide along the guide rail.

17. The cleaner of claim 16, wherein the rotation assembly comprises at least one gear which transmits a force of the motor to the housing.

18. The cleaner of claim 16, further comprising a circuit board electrically connected to the sensor module and coupled to the rotation guide.

19. A cleaner comprising:
a main body;
a lid coupled to the main body;
a sensor module including at least one sensor that senses information around the main body; and
a rotation assembly panning the sensor in a left-right direction with respect to the lid, wherein the rotation assembly comprises:
a motor mounted to the lid;
a rotation guide rotatably coupled to the lid and rotatable by the motor;
a housing fixed to the rotation guide and coupled to at least a part of the sensor module, wherein the rotation assembly rotates the sensor around an inner periphery of the lid.

* * * * *